United States Patent [19]

Muguruma et al.

[11] Patent Number: 4,703,304
[45] Date of Patent: Oct. 27, 1987

[54] SHIFT INDICATOR SYSTEM FOR VEHICLE

[75] Inventors: Taku Muguruma; Seiji Ohuchi, both of Hiroshima, Japan

[73] Assignee: Mazda Motor Corporation, Japan

[21] Appl. No.: 888,362

[22] Filed: Jul. 23, 1986

[30] Foreign Application Priority Data

Jul. 24, 1985 [JP] Japan ................. 60-164941

[51] Int. Cl.[4] ............................ F16H 5/66
[52] U.S. Cl. ................. 340/52 R; 364/424.1; 74/861
[58] Field of Search ............ 340/52 R, 52 F; 364/424.1, 442; 74/861

[56] References Cited

U.S. PATENT DOCUMENTS

| 4,438,423 | 3/1984 | Stier | 340/52 R |
| 4,492,112 | 1/1985 | Igarashi et al. | 364/424.1 X |
| 4,539,868 | 9/1985 | Habu | 340/52 F X |
| 4,555,691 | 11/1985 | Hosaka et al. | 340/52 R |
| 4,564,906 | 1/1986 | Stephan et al. | 364/424.1 |
| 4,604,700 | 8/1986 | Igarashi et al. | 364/442 X |
| 4,622,637 | 11/1986 | Tomita et al. | 364/424.1 |
| 4,631,515 | 12/1986 | Blee et al. | 340/52 F X |

FOREIGN PATENT DOCUMENTS

| 3128080 | 2/1983 | Fed. Rep. of Germany | 340/52 F |
| 170633 | 10/1983 | Japan | 340/52 R |
| 200839 | 11/1983 | Japan | 340/52 F |
| 59-26332 | 2/1984 | Japan | |
| 59-29519 | 2/1984 | Japan | |
| 59-29520 | 2/1984 | Japan | |

Primary Examiner—Stewart J. Levy
Assistant Examiner—Joseph W. Roskos
Attorney, Agent, or Firm—Gerald J. Ferguson, Jr.; Michael P. Hoffman; Michael J. Foycik

[57] ABSTRACT

A shift indicator system for a vehicle comprises an engine speed sensor for detecting the engine speed, a comparator which receives the output of the engine speed sensor and compares the detected engine speed with a preset speed, an indicator which receives the output of the comparator and provides an indication for directing upshifting, an adverse condition sensor for detecting an adverse condition which can adversely affect the engine output power, and a correcting circuit which receives the output of the adverse condition sensor and increases the preset speed when the adverse condition is detected.

18 Claims, 6 Drawing Figures

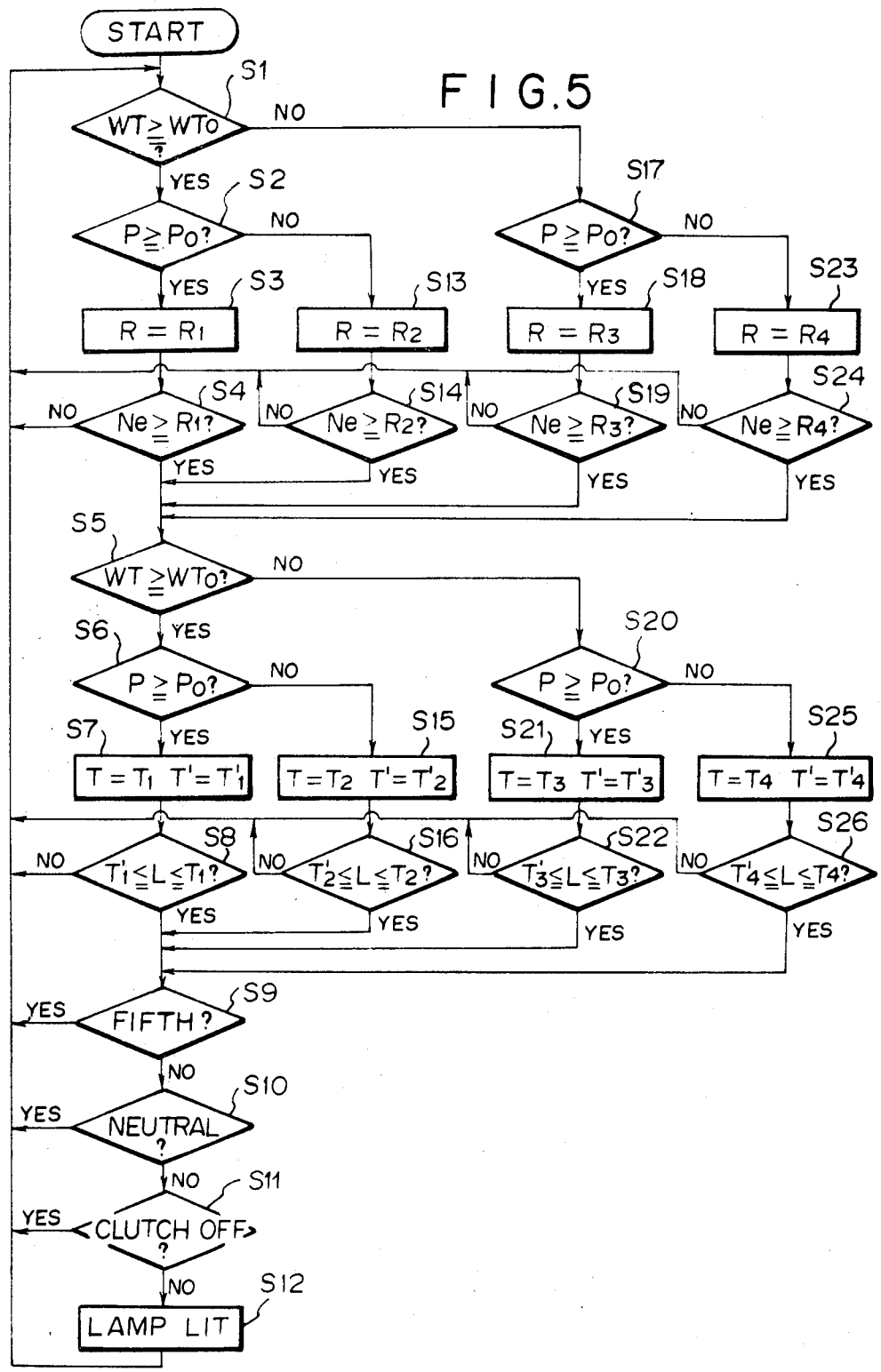

SHIFT INDICATOR SYSTEM FOR VEHICLE

BACKGROUND OF THE INVENTION

1. Field of the Invention

This invention relates to a shift indicator system for a vehicle, and more particularly to a shift indicator system for a vehicle for indicating to the driver the timing to shift so that an optimal fuel-economy can be obtained while maintaining a desired running performance.

2. Description of the Prior Art

In the case of a vehicle provided with a manual transmission, the driver shifts at timings determined by his own judgment so that a desired running condition is obtained. However, if the shifting timing is not appropriate, e.g., if a lower gear speed is kept in an operating range of the engine in which a sufficient driving force can be obtained even in the next higher gear speed, fuel-economy is reduced. Thus, there have been proposed shift indicators for directing the driver to shift when it is preferred in view of the fuel-economy. See Japanese Unexamined Patent Publication Nos. 59(1984)-26332, 59(1984)-29519 and 59(1984)-29520. In the shift indicators, there is defined an engine operational range in which the engine speed is higher than a predetermined value and the throttle opening or the engine load is between predetermined upper and lower limits and in which the transmission gear should be shifted up in order to improve fuel-economy (such an operational range will be referred to as an "upshift range", hereinbelow), and when the actual engine operating condition enters the upshift range, a lamp and/or a buzzer are energized to direct the driver to upshift. The upshift range is determined in the following manner, for instance. Now, it is assumed that the engine operating condition is as represented by point A (engine speed=N, engine load=P) in the operating range diagram of FIG. 6 and that the engine operating condition is changed as represented by point B (engine speed=N', engine load=P') by shifting up the transmission gear and pushing down the accelerator pedal to maintain the vehicle speed. At this time, there must be obtained an engine output power sufficient to maintain the vehicle speed against the reduction in the engine speed and against the increase in the engine load. That is, the engine speed N' after the upshift must be higher than a predetermined value and the engine load P' after the upshift must be lighter than a predetermined value. Thus the lower limit of the engine and the upper limit of the engine load for the upshift range are determined. The lower limit of the engine load is generally set to be equal to the upper limit of the engine load defining a deceleration range so that indication of upshifting is not made during deceleration under low load. By shifting up the transmission gear when the engine operating condition is in the upshift range, fuel-economy can be improved by virtue of reduction of the sliding resistance in various parts of the engine due to reduction of the engine speed, reduction of the pumping loss due to increased throttle opening, and the like.

The indication of upshifting must be provided in such a manner that when the driver upshifts following the indication, the operating condition desired by the driver is ensured. However, in the conventional shift indicator, there has been a problem that when the engine output power properties are changed due to some reasons, the desired operating condition cannot be obtained after upshifting.

For example, when the transmission gear is shifted up at an engine speed near the lower limit of the engine speed in the upshift range or at engine load near the upper limit of the engine load in the upshift range before the engine is sufficiently warmed up, the vehicle speed cannot be maintained in response to depression of the accelerator pedal since the engine output power is generally lowered when the engine warm-up is insufficient and accordingly the required engine output cannot be obtained at the engine speed after the upshift. Similarly, when the transmission gear is shifted up at an engine load near the upper limit of the engine load in the upshift range before the engine is sufficiently warmed up, the vehicle speed cannot be maintained in response to depression of the accelerator pedal since the engine output required to match the increased engine load after the upshift cannot be obtained. In these cases, the driver must downshift soon. This will adversely affect the reliability of the indication.

Similar problems can arise when traveling at a high altitude because of reduction in the engine output due to low air density.

SUMMARY OF THE INVENTION

In view of the foregoing observations and description, the primary object of the present invention is to provide a shift indicator system which can provide appropriate indication irrespective of the operating conditions of the engine.

The shift indicator system in accordance with the present invention comprises an engine speed detecting means for detecting the engine speed, a comparator means which receives the output of the engine speed detecting means and compares the detected engine speed with a preset speed, an indicator means which receives the output of the comparator means and provides an indication for directing upshifting, an adverse condition detecting means for detecting an adverse condition which can adversely affect the engine output power, and a correcting means which receives the output of the adverse condition detecting means and increases said preset speed when the adverse condition is detected.

The adverse condition, may be a low engine temperature, a low density of intake air, or the like.

In accordance with the present invention, when the engine output power is lowered substantially over the entire operating range due to existence of an adverse condition, the lower limit of the engine speed above which the indication of upshifting is to be provided is raised. Accordingly, the engine speed after upshifting will be high enough to cancel out reduction of the engine output power due to the adverse condition even if the upshifting is made at an engine speed near the lower limit, and a desired engine operating condition can be maintained after the upshifting.

In one preferred embodiment of the present invention, the indication of upshifting is provided when the engine speed is higher than the preset speed and at the same time the engine load is lighter than a preset load value, and the preset speed is raised and the preset load value is lowered when the condition which can adversely affect the engine output power is detected.

In this embodiment, when the adverse condition is detected, the indication of upshifting is not provided until the engine load becomes light enough to make the engine load after upshifting light enough to cancel out reduction of the engine output power due to the adverse condition even if the upshifting is made at an engine load near the upper limit of the engine load below which the indication of upshifting is permitted to be provided.

BRIEF DESCRIPTION OF THE DRAWINGS

FIG. 5 is a flow chart for illustrating the operation of the control section.

DESCRIPTION OF THE PREFERRED EMBODIMENT

Figure 1:
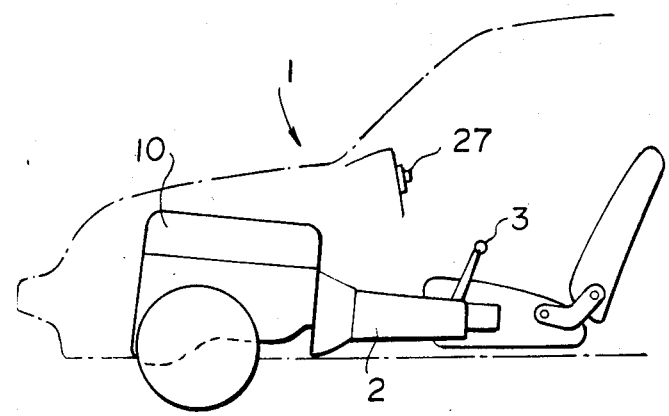
FIG. 1 is a schematic view showing a vehicle provided with a shift indicator system in accordance with an embodiment of the present invention.

In FIG. 1, a vehicle 1 provided with a shift indicator system in accordance with the present invention has an engine 10, a manual transmission 2 and a shift lever 3. An upshift indicator lamp 27 for directing the driver to upshift is provided on an instrument panel of the vehicle 1.

Figure 2:
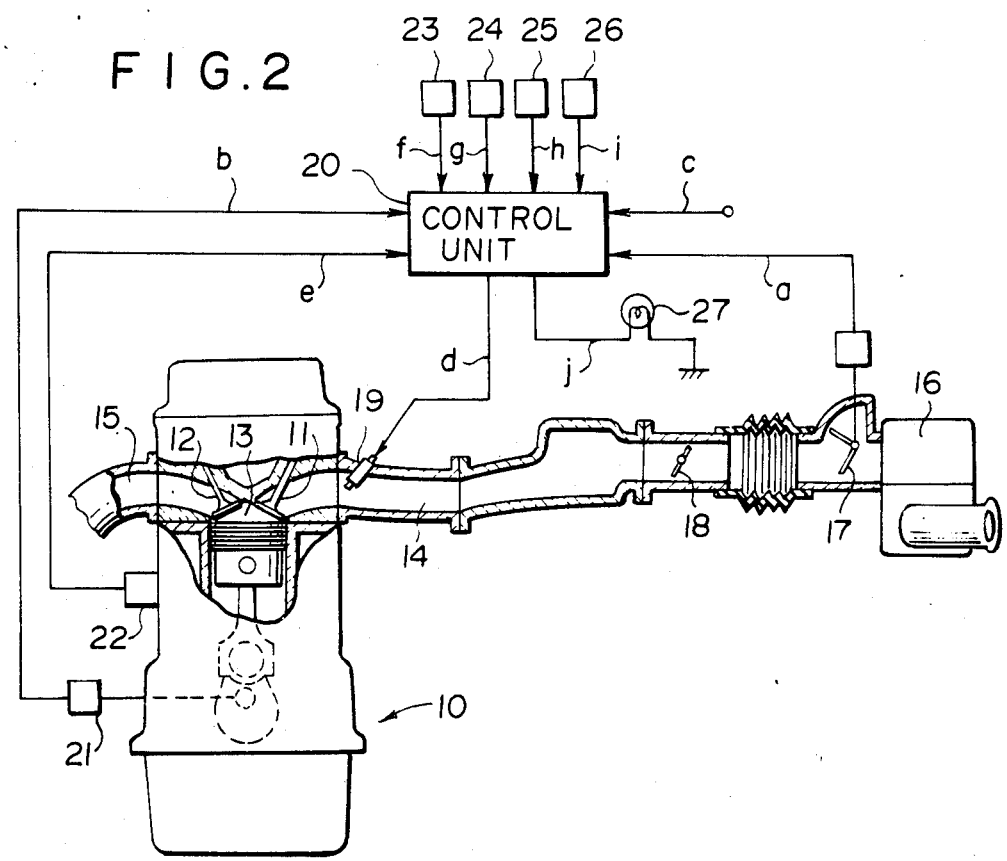
FIG. 2 is a schematic view showing the control system of the vehicle.

As shown in FIG. 2, the engine 10 is provided with an intake passage 14 and an exhaust passage 15 communicated with a combustion chamber 13 respectively by way of intake and exhaust valves 11 and 12. In the intake passage 14, there are disposed an air cleaner 16, an airflow meter 17, a throttle valve 18, and a fuel injection valve 19 in this order from the upstream side. Though not shown, an emission control system, a muffler and the like are provided in the exhaust passage 15.

The engine 10 is further provided with a control unit 20 for controlling the amount of fuel to be injected from the fuel injection valve 19. An intake air amount signal a from the airflow meter 17, an engine speed signal b from an engine speed sensor 21, and an ignition signal c from the ignition system (not shown) are input into the control unit 20. The control unit 20 calculates the amount of fuel to be injected for one cycle on the basis of the intake air amount signal a and the engine speed signal b, and delivers to the fuel injection valve 19 a pulse signal d having a width corresponding to the amount of fuel to be injected in synchronization with the ignition signal c. Thus, the fuel injection valve 19 injects fuel in an amount corresponding to the amount of intake air or the engine load.

Further, into the control unit 20 are input a coolant temperature signal e from a coolant temperature sensor 22, an atmospheric pressure signal f from an atmospheric pressure sensor 23, a fifth speed signal g from a fifth speed switch 24 for detecting whether the transmission 2 is in fifth, i.e., the highest speed, a neutral signal h from a neutral switch for detecting whether the transmission 2 is in neutral, and a clutch signal i from a clutch switch 26 for detecting whether the clutch (not shown) is engaged or disengaged. On the basis of these signals e to i together with the engine speed signal b and the pulse signal d, the controller 20 determines whether the transmission 2 is to be shifted up and when it is determined so, the controller 20 delivers an upshift signal j to the upshift indicator lamp 27 to light it. The fifth speed signal g is at a high level when the transmission 2 is in fifth and the neutral signal h is at a high level when the transmission 2 is in neutral. The clutch signal i is at a high level when the clutch is disengaged.

Figure 3:
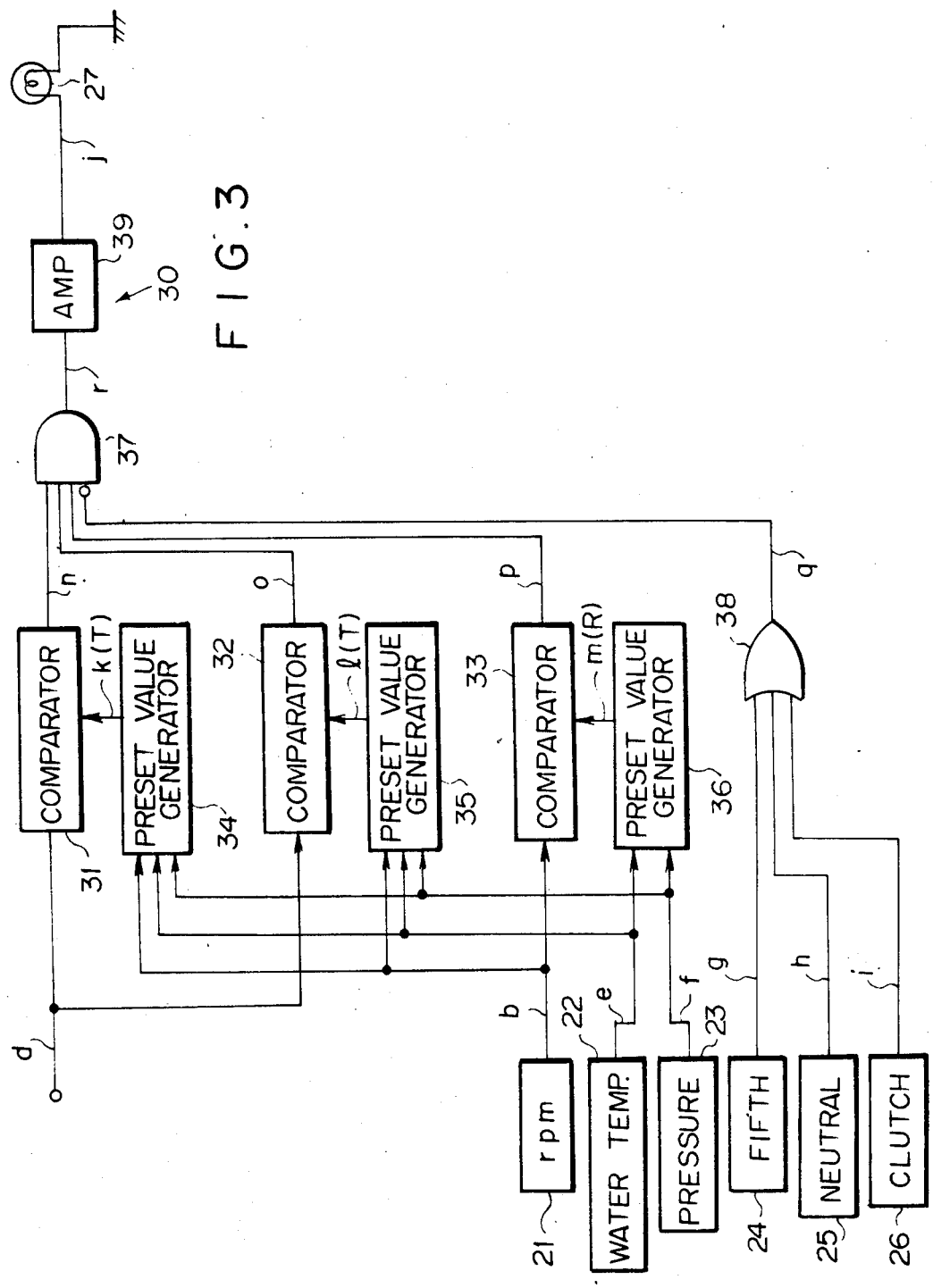
FIG. 3 is a block diagram of the control section of the shift indicator system.

FIG. 3 shows an indicator control section of the control unit 20 for controlling the upshift indicator lamp 27. The indicator control section 30 comprises a heavy load comparator circuit 31, a light load comparator circuit 32, an engine speed comparator circuit 33, a higher preset load generator 34, a lower preset load generator 35 and a preset engine speed generator 36. The generators 34 to 36 respectively deliver a higher preset load signal k, a lower preset load signal l and a preset engine speed signal m to the comparator circuits 31 to 33, the signals k to m respectively representing a higher preset load T, a lower preset load T' and a preset engine speed R to be used as reference values in the comparator circuits 31 to 33. The fuel injection pulse signal d is input into both the heavy load comparator circuit 31 and the light load comparator circuit 32. The heavy load comparator circuit 31 outputs a signal n which is at a high level when the engine load represented by the width of the fuel injection pulse signal d is lighter than the higher preset load T, and the light load comparator circuit 32 outputs a signal o which is at a high level when the engine load represented by the width of the fuel injection pulse signal d is lighter than the lower preset load T'. The engine speed comparator circuit 33 receives the engine speed signal b and outputs a signal p which is at a high level when the engine speed represent by the engine speed signal b is higher than the preset engine speed R.

Figure 4:
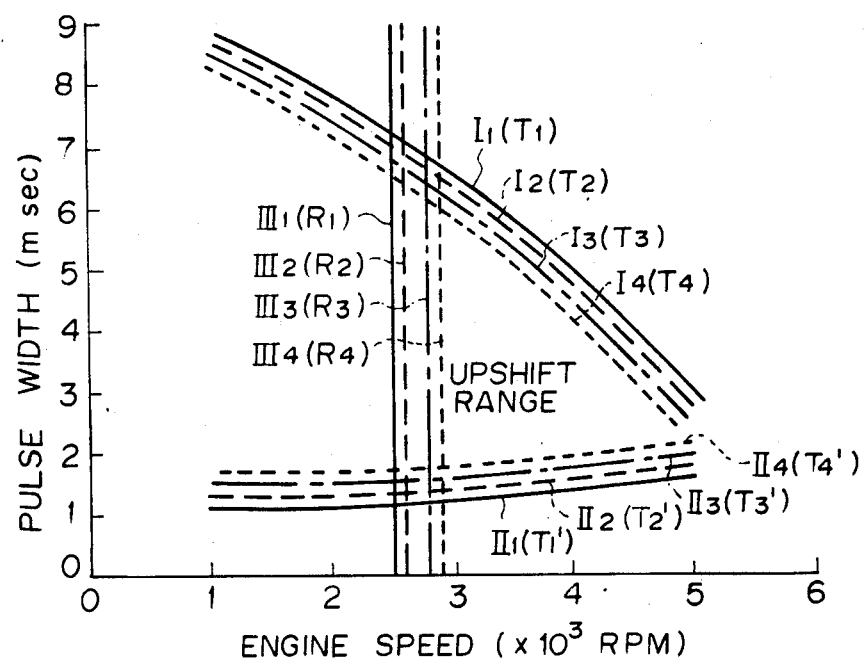
FIG. 4 is a view for illustrating the concept of the present invention.
Figure 6:
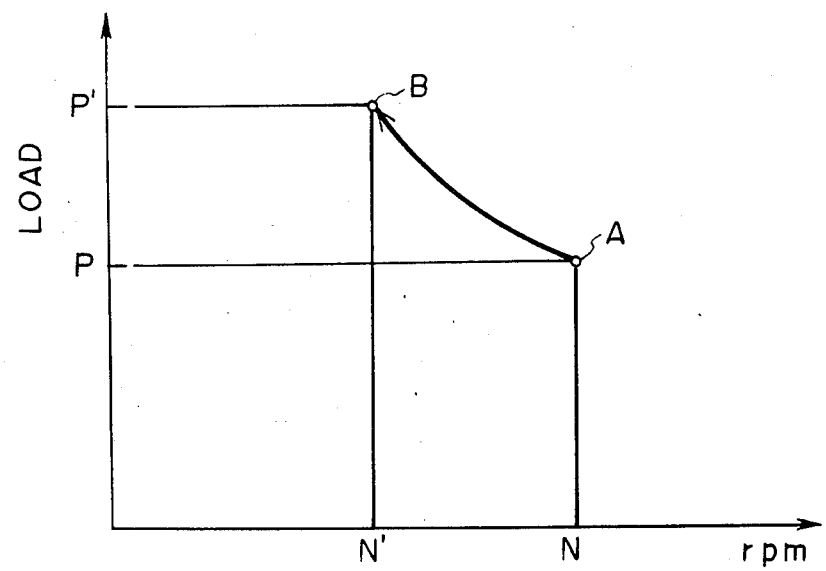
FIG. 6 is a view for illustrating the change in the operating condition of the engine in response to upshift.

The engine speed signal b is also input into the higher preset load generator 34 and the lower preset load generator 35, and the comparators 34 and 35 respectively generate the higher preset load T and the lower preset load T' which are set as a function of the engine speed as represented by lines $I_I$ and $II_1$ in FIG. 4. The higher preset load line $I_1$ defines the upper limit of the engine load below which an engine output power is sufficient to maintain the vehicle speed against the increase in the engine load in response to upshift. The lower preset load line $II_1$ corresponds to a no-load line representing a so-called half-deceleration state of the vehicle, and in the range on the lighter load side of the line $II_1$, indication of upshifting is not provided in any case. The preset engine speed R does not vary with the engine load and is accordingly represented by line $III_1$ in FIG. 4.

The higher preset load line $I_1$, the lower preset load line $II_1$ and the preset engine speed line $III_1$ are determined based on the engine output characteristics under an optimal condition, and they are corrected when warm-up of the engine is insufficient and/or the density of intake air is low. As shown in FIG. 3, the coolant temperature signal e and the atmospheric pressure signal f are input into the generators 34 to 36 and the lines $I_1$, $II_1$ and $III_1$ are corrected according to the coolant temperature and the atmospheric pressure respectively represented by the signals e and f. That is, for a given condition, the engine output power is the maximum when the engine 10 is warm and the air density is high, and becomes less when the engine 10 is warm and the air density is low, when the engine 10 is cold and the air density is high and when the engine 10 is cold and the air density is low in this order. Accordingly, the higher preset engine load line $I_1$ is corrected toward the lower engine load side in correspondence with these conditions, that is, $I_2$, $I_3$ and $I_4$ are set in correspondence with these conditions. Similarly, the lower preset engine load line $II_1$ is corrected toward the higher engine load side ($II_2$, $II_3$ and $II_4$) and the preset engine speed line $III_1$ is corrected toward the higher engine speed side ($III_1$, $III_2$ and $III_3$).

As shown in FIG. 3, the output signals n, o and p of the comparator circuits 31 to 33 are input into an AND circuit 37, and the fifth speed signal g, the neutral signal h and the clutch signal i are input into an OR circuit 38. When the signals g, h and i are all at the low level, that is, when the transmission is neither in fifth nor in neutral and the clutch is engaged, the OR circuit 38 outputs a signal q at the low level and the signal q is inverted into a high level signal and is input into the AND circuit 37. The AND circuit 37 outputs a signal r at the high level when the output signals n, o and p of the comparator circuits 31 to 33 are all at the high level and the output signal r of the OR circuit 38 is at the low level. The output signal r of the AND circuit 37 is input into the indicator lamp 27 by way of an amplifier 39.

The operation of the shift indicator system of this embodiment will be described in conjunction with the flow chart of the operation of the indicator lamp control section 30.

In FIG. 5, the control section 30 first determines whether the coolant temperature WT is not lower than a predetermined temperature WTo (step S1). When it is determined that the coolant temperature WT is not lower than the predetermined temperature To, it is determined whether the atmospheric pressure P is not lower than a predetermined pressure Po in step S2. When it is determined that the atmospheric pressure P is not lower than the predetermined pressure Po in the step S2, the preset engine speed R is set to a first preset engine speed R1 based on the line $III_1$ in step S3. Then in step S4, the actual engine speed Ne is compared with the first preset engine speed R1. When the former is not lower than the latter, the control section 30 proceeds to step S7 after it is confirmed that the coolant temperature WT is not lower than the predetermined value WTo and that the atmospheric pressure P is not lower than the predetermined pressure Po in steps S5 and S6. In the step S7, the higher preset engine load T is set to a first higher preset engine load T1 based on the line $I_1$, and the lower preset engine load T' is set to a first lower preset engine load T'1 based on the line $II_1$. Thereafter, when the actual engine load L represented by the width of the fuel injection pulse signal d is not heavier than the first higher preset engine load T1 and not lighter than the first lower preset engine load T'1 (step S8), and at the same time, the transmission is neither in fifth speed (in which further upshift is impossible) nor in neutral (steps S9 and S10) and the clutch is engaged (step S11), the upshift signal j is delivered to the indicator lamp 27 to light it (step S12). When it is not determined that the actual engine speed Ne is not lower than the first preset engine speed R1 in the step S4, when it is not determined that the actual engine load L is not heavier than the first higher preset engine load T1 and not lighter than the first lower preset engine load T'1 in the step S8, when it is determined that the transmission is in fifth speed in the step S9, when it is determined that the transmission is in neutral in the step S10, or when it is determined that the clutch is disengaged in the step S11, the indicator lamp 27 is not lit. That is, when the engine 10 has been sufficiently warmed up and the intake air density is high, the indicator lamp 27 is lit when the operating condition of the engine 10 is in the range defined by the lines $I_1$, $II_1$, and $III_1$ so long as upshift is possible.

When the coolant temperature WT is not lower than the predetermined temperature WTo but the atmospheric pressure P is lower than the predetermined pressure Po, the control section 30 proceeds to step S13 from the step S2, and sets the preset engine speed R to a second preset engine speed R2 based on the line $III_2$, the higher preset engine load T to a second higher preset engine load T2 based on the line $I_2$, and the lower engine preset engine load T to a second lower preset engine load T'2 based on the line $II_2$ by way of steps S13, S14, S5, S6, S15 and S16. That is, in this case, the upshift range is defined as the range surrounded by the lines $I_2$, $II_2$ and $III_2$, which is narrower than the range surrounded by the lines $I_1$, $II_1$, and $III_1$.

When the coolant temperature WT is lower than the predetermined temperature WTo but the atmospheric pressure P is not lower than the predetermined pressure Po, the control section 30 proceeds to step S18 from the step S1 by way of step S17, and sets the preset engine speed R to a third preset engine speed R3 based on the line $III_3$, the higher preset engine load T to a third higher preset engine load T3 based on the line $I_3$, and the lower engine preset engine load T to a third lower preset engine load T'3 based on the line $II_3$ by way of steps S19, S5, S20, S21 and S22. That is, in this case, the upshift range is defined as the range surrounded by the lines $I_3$, $II_3$ and $III_3$ which is further narrower than the range surrounded by the lines $I_1$, $II_1$, and $III_1$.

When the coolant temperature WT is lower than the predetermined temperature WTo and the atmospheric pressure P is lower than the predetermined pressure Po, the control section 30 proceeds to step S23 from the step S1 by way of step S17, and sets the preset engine speed R to a fourth preset engine speed R4 based on the line $III_4$, the higher preset engine load T to a fourth higher preset engine load T4 based on the line $I_4$, and the lower engine preset engine load T to a fourth lower preset engine load T'4 based on the line $II_4$ by way of steps S24, S5, S20, S25 and S26. That is, in this case, the upshift range is defined as the range surrounded by the lines $I_4$, $II_4$ and $III_4$ which is still further narrower than the range surrounded by the lines $I_1$, $II_1$, and $III_1$.

Though a low coolant temperature and a low intake air density are employed as the adverse conditions adversely affecting the engine output power in this particular embodiment, only one of them may be employed depending on the environment in which the vehicle is expected to be mainly used and other adverse conditions may be added.

Further, in this particular embodiment, the lower preset engine load line $II_1$ corresponds to the no-load line as described above. This is advantageous in that indication of upshifting is inhibited, in addition to during true deceleration, during a so-called half-deceleration of the vehicle in which the engine output power balances with the driving force from the wheels and the vehicle is decelerated by the running resistance, and in which the throttle valve is opened to some extent. On the other hand, in the case of conventional shift indicator systems, indication of upshifting is inhibited only during true deceleration in which the throttle valve is fully closed or substantially fully closed, deceleration of the vehicle being detected through the throttle opening. However, when the vehicle is in a state of half-deceleration in which the throttle valve is somewhat opened, the driver does not intend to accelerate the vehicle, and accordingly if indication of upshifting is provided in the state, he will be confused.

Instead of the no-load line, a low-load line which defines a boundary between the acceleration range and the deceleration range may be employed as the lower preset engine load line. In this case, indication of upshifting is inhibited over the entire deceleration range including a state of the half-deceleration.

We claim:

1. A shift indicator system for a vehicle comprising an engine speed detecting means for detecting the engine speed, an indicator means for providing an indication for directing upshifting, and a controller which includes a comparator means which receives the output of the engine speed detecting means and compares the detected engine speed with a preset speed, an adverse condition detecting means for detecting an adverse condition which can adversely affect the engine output power, and a correcting means which receives the output of the adverse condition detecting means and increases said preset speed when the adverse condition is detected, and permits said indicator means to provide the indication for directing upshifting when the detected engine speed is higher than the preset engine speed, wherein said adverse condition is that the intake air density is low.

2. A shift indicator system as defined in claim 1 in which said adverse condition detecting means detects that the intake air density is low by way of the atmospheric pressure.

3. A shift indicator system as defined in claim 1 in which said controller further comprises a second comparator means which receives an output of an engine load detecting means and compares the detected engine load with a first preset engine load and the controller permits said indicator means to provide the indication for directing upshifting when the detected engine load is not heavier than the first preset engine load.

4. A shift indicator system as defined in claim 3 in which said correcting means corrects the first preset engine load to a lower value when the adverse condition is detected.

5. A shift indicator system as defined in claim 3 in which said controller further comprises a third comparator means which receives the output of the engine load detecting means and compares the detected engine load with a second preset engine load lighter than said first preset engine load and the controller permits said indicator means to provide the indication for directing upshifting when the detected engine load is not lighter than the second preset engine load.

6. A shift indicator system as defined in claim 5 in which said correcting means corrects said second preset engine load to increase as the engine speed increases.

7. A shift indicator system as defined in claim 6 in which said correcting means increases the second preset engine load when said adverse condition is detected.

8. A shift indicator system as defined in claim 7 in which said adverse condition detecting means detects that the intake air density is low by way of the atmospheric pressure.

9. A shift indicator system as defined in claim 1 in which said controller further comprises a second comparator means which receives an output of an engine load detecting means and compares the detected engine load with a preset engine load and the controller permits said indicator means to provide the indication for directing upshifting when the detected engine load is not lighter than the preset engine load.

10. A shift indicator system as defined in claim 9 in which said correcting means corrects said preset engine load to a higher value as the engine speed increases.

11. A shift indicator system as defined in claim 10 in which said correcting means increases the preset engine load when said adverse condition is detected.

12. A shift indicator system as defined in claim 11 in which said adverse condition detecting means detects that the intake air density is low by way of the atmospheric pressure.

13. A shift indicator system for a vehicle comprising an engine speed detecting means for detecting the engine speed, and engine load detecting means for detecting the engine load, an indicator means for providing an indication for directing uphsifting, and a controller which includes a first comparator means which receives the output of the engine speed and compares the detected engine speed with a present speed, a second comparator means which receives the output of the engine load detecting means and compares the detected engine load with a preset engine load, an adverse condition detecting means for detecting an adverse condition which can adversely affect the engine output power, and a correcting means which receives the output of the adverse condition detecting means and reduces said present engine load when the adverse condition is detected, and permits said indicator means to provide the indication for directing upshifting when the detected engine load is lighter than the present engine load, wherein said adverse condition is that the intake air density is low.

14. A shift indicator system as defined in claim 13 in which said adverse condition detecting means detects that the intake air density is low by way of the atmospheric pressure.

15. A shift indicator system for a vehicle comprising an engine speed detecting means for detecting the engine speed, an indicator means for providing an indication for directing upshifting, and a controller which includes a first comparator means which receives the output of the engine speed detecting means and compares the detected engine speed with a preset speed, a second comparator means which receives an output of an engine load detecting means and compares the detected engine load with a first preset engine load, a third comparator means which receives the output of the engine load detecting means and compares the detected engine load with a second preset engine load lighter that said first preset engine load, an adverse condition detecting means for detecting an adverse condition which can adversely affect the engine output power, and a correcting means which receives the output of the adverse condition detecting means and increases said preset speed when the adverse condition is detected, and permits said indicator means to provide the indication for directing upshifting when the detected engine speed is higher than the preset engine speed, wherein the controller permits said indicator means to provide the indication for directing upshifting when the detected engine load is not heavier than the first preset engine load and not lighter than the second preset engine load.

16. A shift indicator system as defined in claim 15 in which said correcting means corrects said second present engine load to increase as the engine speed increases.

17. A shift indicator system as defined in claim 16 in which said correcting means increases the second preset load when said adverse condition is detected.

18. A shift indicator system as defined in claim 17, in which said adverse condition is that the engine is cold.

* * * * *